(12) United States Patent
Takeuchi et al.

(10) Patent No.: US 11,397,735 B2
(45) Date of Patent: Jul. 26, 2022

(54) PRODUCTION INFORMATION MANAGEMENT SYSTEM

(71) Applicant: SAKAI DISPLAY PRODUCTS CORPORATION, Sakai (JP)

(72) Inventors: Hiroaki Takeuchi, Sakai (JP); Kumi Miura, Sakai (JP)

(73) Assignee: SAKAI DISPLAY PRODUCTS CORPORATION, Sakai (JP)

( * ) Notice: Subject to any disclaimer, the term of this patent is extended or adjusted under 35 U.S.C. 154(b) by 0 days.

(21) Appl. No.: 17/189,693

(22) Filed: Mar. 2, 2021

(65) Prior Publication Data

US 2021/0279236 A1 Sep. 9, 2021

(30) Foreign Application Priority Data

Mar. 5, 2020 (JP) .............................. JP2020-037931

(51) Int. Cl.
*G06F 16/2455* (2019.01)
*G06F 16/248* (2019.01)

(52) U.S. Cl.
CPC ........ *G06F 16/2455* (2019.01); *G06F 16/248* (2019.01)

(58) Field of Classification Search
CPC ............................ G06F 16/2455; G06F 16/248
USPC ........................................................ 707/722
See application file for complete search history.

(56) References Cited

U.S. PATENT DOCUMENTS

| | | | | |
|---|---|---|---|---|
| 2004/0053429 A1* | 3/2004 | Muranaka | ............ | G05B 19/128 |
| | | | | 257/E23.179 |
| 2004/0117404 A1* | 6/2004 | Crivella | ................. | G06N 5/022 |
| 2008/0120129 A1* | 5/2008 | Seubert | ................ | G06Q 40/125 |
| | | | | 705/305 |
| 2015/0330640 A1* | 11/2015 | Stork Genannt Wersborg | | ............ G01J 5/0044 |
| | | | | 99/332 |
| 2017/0300753 A1* | 10/2017 | Billi | ....................... | H04N 5/765 |
| 2018/0018719 A1* | 1/2018 | Cao | ..................... | G06Q 30/018 |
| 2018/0035661 A1* | 2/2018 | Tanabe | .................. | G16H 40/63 |
| 2019/0339687 A1* | 11/2019 | Celia | ..................... | G06N 3/006 |
| 2020/0133254 A1* | 4/2020 | Celia | ................. | G05B 19/4185 |
| 2021/0208571 A1* | 7/2021 | Thomsen | ......... | G06Q 10/06395 |

FOREIGN PATENT DOCUMENTS

JP 2020-004098 A 1/2020

* cited by examiner

*Primary Examiner* — Dung K Chau (74) *Attorney, Agent, or Firm* — ScienBiziP, P.C.

(57) ABSTRACT

A production information management system includes a storage device, a search tool, a data processing tool, and an integration tool. The storage device stores production information therein. The data processing tool performs data processing based on input data. Based on processing procedure information indicating a predetermined processing procedure, the integration tool performs a series of processes according to the processing procedure using a plurality of individual tools including the search tool and the data processing tool. The integration tool inputs a search condition based on the processing procedure information to the search tool information and causes the search tool to acquire data meeting the search condition from the production information. The integration tool inputs search result data acquired by the search tool to the data processing tool and causes the data processing tool to perform data processing based on the search result data.

12 Claims, 9 Drawing Sheets

| TV product number | TV inspection date | TV inspection determination | TV defect mode | TV defect coordinates | Used panel number |
|---|---|---|---|---|---|
| A1 | 2020/1/1 | OK | – | | P5 |
| A2 | 2020/1/1 | OK | – | | P4 |
| A3 | 2020/1/1 | NG | Mode 1 | X1,Y1 | P11 |
| A4 | 2020/1/1 | OK | – | | P16 |
| A5 | 2020/1/1 | OK | – | | P7 |
| A6 | 2020/1/1 | OK | – | | P19 |
| A7 | 2020/1/1 | OK | – | | P1 |
| A8 | 2020/1/1 | NG | Mode 2 | X2,Y2 | P6 |
| A9 | 2020/1/1 | NG | Mode 1 | X1,Y1 | P3 |
| A10 | 2020/1/1 | OK | – | | P8 |
| A11 | 2020/1/2 | OK | – | | P14 |
| A12 | 2020/1/2 | OK | – | | P18 |
| A13 | 2020/1/2 | OK | – | | P15 |
| A14 | 2020/1/2 | OK | – | | P10 |
| A15 | 2020/1/2 | NG | Mode 1 | X1,Y1 | P13 |
| A16 | 2020/1/2 | OK | – | | P20 |
| A17 | 2020/1/2 | OK | – | | P17 |
| A18 | 2020/1/2 | NG | Mode 2 | X2,Y2 | P12 |
| A19 | 2020/1/2 | OK | – | | P9 |
| A20 | 2020/1/2 | NG | Mode 1 | X1,Y1 | P2 |

| TV product number | TV inspection date | TV inspection determination | TV defect mode | TV defect coordinates | Used panel number |
|---|---|---|---|---|---|
| A3 | 2020/1/1 | NG | Mode 1 | X1,Y1 | P11 |
| A9 | 2020/1/1 | NG | Mode 1 | X1,Y1 | P3 |
| A15 | 2020/1/2 | NG | Mode 1 | X1,Y1 | P13 |
| A20 | 2020/1/2 | NG | Mode 1 | X1,Y1 | P2 |

| Panel number | Panel process inspection result | Film forming device number | Film formation process date | Film formation pressure | Etching device number | Etching process date | Etching pressure |
|---|---|---|---|---|---|---|---|
| P2 | OK | Machine 3 | 2019/11/26 | Somewhat high | Machine 2 | 2019/12/1 | Somewhat low |
| P3 | OK | Machine 3 | 2019/11/26 | Somewhat high | Machine 3 | 2019/12/11 | Somewhat high |
| P11 | OK | Machine 3 | 2019/11/26 | Somewhat high | Machine 1 | 2019/12/10 | Normal |
| P13 | OK | Machine 3 | 2019/11/26 | Somewhat high | Machine 3 | 2019/12/22 | Normal |

| Panel number | Panel process inspection result | Film forming device number | Film formation process date | Film formation pressure |
|---|---|---|---|---|
| P2 | OK | Machine 3 | 2019/11/26 | Somewhat high |
| P3 | OK | Machine 3 | 2019/11/26 | Somewhat high |
| P11 | OK | Machine 3 | 2019/11/26 | Somewhat high |
| P13 | OK | Machine 3 | 2019/11/26 | Somewhat high |

| TV product number | TV inspection date | TV inspection determination | TV defect mode | TV defect coordinates | Panel number | Panel process inspection result | Film forming device number | Film formation process date | Film formation pressure |
|---|---|---|---|---|---|---|---|---|---|
| A3 | 2020/1/1 | NG | Mode 1 | X1,Y1 | P11 | OK | Machine 3 | 2019/11/26 | Somewhat high |
| A9 | 2020/1/1 | NG | Mode 1 | X1,Y1 | P3 | OK | Machine 3 | 2019/11/26 | Somewhat high |
| A15 | 2020/1/2 | NG | Mode 1 | X1,Y1 | P13 | OK | Machine 3 | 2019/11/26 | Somewhat high |
| A20 | 2020/1/2 | NG | Mode 1 | X1,Y1 | P2 | OK | Machine 3 | 2019/11/26 | Somewhat high |

PRODUCTION INFORMATION MANAGEMENT SYSTEM

INCORPORATION BY REFERENCE

The present application claims priority under 35 U.S.C. § 119 to Japanese Patent Application No. 2020-037931, filed on Mar. 5, 2020. The contents of this application are incorporated herein by reference in their entirety.

BACKGROUND

The present disclosure relates to a production information management system.

An existing production management system includes a data server and an information processing device. Data related to production is saved in the data server. The information processing device uses the data to improve productivity in a production line by performing prescribed processing on the data saved in the data server.

SUMMARY

A production information management system according to an aspect of the present disclosure includes a storage device, a search tool, a data processing tool, and an integration tool. The storage device stores production information therein. The production information is information collected in a production system for producing a to-be-produced object. The production information is information related to production of the to-be-produced object. The search tool is capable of accessing the production information stored in the storage device. The search tool searches for and acquires data meeting an input search condition from the production information based on the input search condition. The data processing tool is a tool which is different from the search tool and which does not have a function for operating in direct link with the search tool. The data processing tool performs data processing based on input data. Based on processing procedure information indicating a predetermined processing procedure, the integration tool performs a series of processes according to the processing procedure using a plurality of individual tools including the search tool and the data processing tool. The integration tool inputs a search condition based on the processing procedure to the search tool information and causes the search tool to acquire data meeting the search condition from the production information. The integration tool inputs search result data acquired by the search tool to the data processing tool and causes the data processing tool to perform data processing based on the search result data.

DETAILED DESCRIPTION

The following describes an embodiment of the present disclosure with reference to the accompanying drawings. Note that elements that are the same or equivalent are labeled with the same reference signs in the drawings and description thereof is not repeated.

First Embodiment

Figure 1:
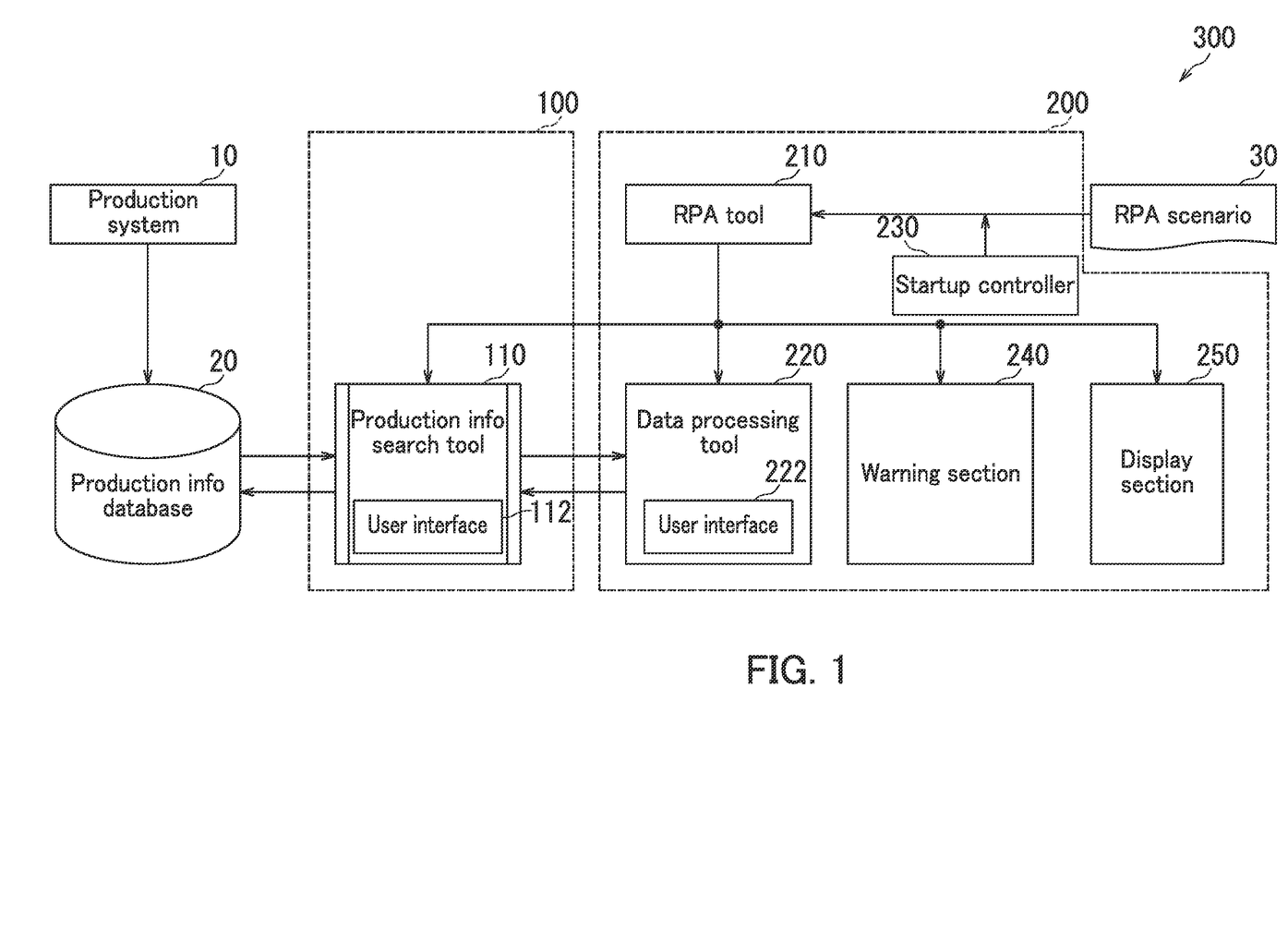
FIG. 1 is a block diagram of a production information management system according to a first embodiment.

A production information management system 300 according to the first embodiment of the present disclosure is described with reference to FIG. 1. FIG. 1 is a block diagram of the production information management system 300 in the first embodiment.

As illustrated in FIG. 1, the production information management system 300 includes a production information database 20, a production information search device 100, and an information processing device 200. Note that the production information database 20 is an example of a "storage device". The production information management system 300 is a system which manages production information of a production system 10.

The production system 10 is a system for producing a to-be-produced object. The production system 10 is for example a system for producing liquid-crystal display televisions, and is constituted by one or more devices. For example, in a case in which the to-be-produced object is a display panel, the production system 10 includes devices such as a conveyor device, a conveyor robot, a cleaning device, a film forming device, a light exposure device, an etching device, a liquid-crystal dropping device, a bonding device, a monitoring device, and an inspection device.

The production information database 20 is a server, for example. The production information database 20 is connected to the production system 10. The production information database 20 stores production information therein. The production information is output from the production system 10. The production information is information collected in the production system 10. Information collected in the production system 10 is information obtained from at least one of the devices constituting the production system 10. The production information is information related to the production of the to-be-produced object. The production information includes at least one of process data, process history data, and inspection result data of the production system 10 each related to the production of the to-be-produced object, for example. The production information database 20 stores therein a product number of each product, the process history data, and the inspection result data, for example.

The production information search device 100 includes a production information search tool 110. The production information search tool 110 can access the production information stored in the production information database 20.

Based on a search condition, the production information search tool 110 searches for and acquires data meeting the search condition from the production information. The search condition includes for example a range of a product inspection time, a target inspection process number, and an inspection data item. Examples of extracted data include production information data such as a product number of each product and inspection result data, for example. The production information search tool 110 is for example a commercially available search tool or a core system dedicated to a factory. The production information search tool 110 differs in application structure from a data processing tool 220. That is, one of the tools cannot control operation of the other. In detail, the production information search tool 110 cannot control the data processing tool 220. Furthermore, the data processing tool 220 cannot control the production information search tool 110. Note that the production information search tool 110 is an example of a "search tool".

The production information search tool 110 includes a user interface 112. The user interface 112 is for example a character user interface or a graphical user interface. Through a character user interface, characters are input from an input device such as a keyboard. Through a graphical user interface, an icon or an image is specified using a pointing device such as a mouse.

The information processing device 200 includes a robotic process automation (RPA) tool 210, a data processing tool 220, a startup controller 230, a warning section 240, and a display section 250. Note that the RPA tool 210 is an example of an "integration tool".

The RPA tool 210 uses individual tools including the production information search tool 110 and the data processing tool 220 to perform a series of processes according to a processing procedure based on an RPA scenario 30. For example, the RPA scenario 30 indicates a predetermined processing procedure. In detail, the RPA scenario 30 pre-stores therein an operation which a user must perform on the production information search tool 110 and an operation which the user must perform on the data processing tool 220, for example. Note that the RPA scenario 30 is an example of "processing procedure information".

The RPA tool 210 performs a series of processes according to the processing procedure indicated by the RPA scenario 30 by causing the individual tools (the production information search tool 110 and the data processing tool 220 in the present embodiment) to operate based on the RPA scenario 30. Specifically, the RPA tool 210 inputs a search condition based on the RPA scenario 30 to the production information search tool 110 and causes the production information search tool 110 to acquire data meeting the search condition from the production information. The RPA tool 210 then inputs the search result data acquired by the production information search tool 110 to the data processing tool 220 and causes the data processing tool 220 to perform data processing based on the search result data. Accordingly, the RPA tool 210 can automatically perform an operation performed by the user on the production information search tool 110 and an operation performed by the user on the data processing tool 220 without necessitating user operation by using the individual tools including the production information search tool 110 and the data processing tool 220 to perform the series of operations based on the processing procedure indicated by the RPA scenario 30.

The RPA tool 210 and the RPA scenario 30 are stored in storage of the information processing device 200. The storage is a hard disk drive (HDD) or a solid-state drive (SSD), for example. The storage may include random-access memory (RAM) and read-only memory (ROM). The RPA tool 210 can link the production information search tool 110 and the data processing tool 220 which do not have a function of operating in direct link with each other.

The data processing tool 220 performs data processing based on input data. In detail, the data processing tool 220 processes the search result data. The data processing tool 220 is a tool which is different from the search tool and which does not have a function for operating in direct link with the production information search tool 110. Here, a "function for operating in direct link" means a function for operating while directly sending and receiving data to and from the production information search tool 110, and does not include a function for indirectly sending and receiving data or a function which does not involve sending and receiving data (for example, file import or file export functions). The data processing tool 220 is spreadsheet software, for example. Data processing performed by the data processing tool 220 includes a modification process. The modification process means a process in which input data is modified. Examples of the modification process include a process to remove a portion of the input data, a process to add new data to the input data, a process to replace a portion of the data included in the input data with different data, and a process to change the arrangement of a portion of the data included in the input data. In the present embodiment, the modification process is performed on the search result data. The RPA tool 210 inputs the search result data and modification method information to the data processing tool 220 and causes the data processing tool 220 to modify the search result data according to the modification method indicated by the modification method information. The modification method information is information indicating what kind of modification is to be performed on the input data, that is, information indicating a modification method. The modification method information is stored in the RPA scenario 30.

The data processing tool 220 includes a user interface 222. The user interface 222 is for example a character user interface or a graphical user interface. Through a character user interface, characters are input from an input device such as a keyboard. Through a graphical user interface, an icon or an image is specified using a pointing device such as a mouse.

The RPA tool 210 causes individual tools to operate through the user interface included in each of the individual tools. Note that in the present embodiment, the RPA tool 210 causing individual tools to operate through user interfaces does not mean that the RPA tool 210 causes the individual tools to operate using an input device such as a keyboard or a pointing device, but means that the RPA tool 210 causes the individual tools to operate using receiving windows (interfaces) through which the individual tools acquire input information from an input device. Accordingly, the RPA tool 210 causes each of the individual tools to perform a desired operation by inputting input information for causing the individual tools to operate through the interfaces of the individual tools. For example, the RPA tool 210 causes the production information search tool 110 to operate through the user interface 112 included in the production information search tool 110. For another example, the RPA tool 210 causes the data processing tool 220 to operate through the user interface 222 included in the data processing tool 220.

The startup controller 230 controls the timing at which the RPA tool 210 starts performing the series of processes according to the RPA scenario 30. For example, the startup controller 230 includes a timer and instructs activation of the RPA tool 210 and loading and performance of the RPA scenario 30 at each prescribed time such that the series of processes is performed according to the RPA scenario 30 at each prescribed time. In detail, the startup controller 230 for example activates the RPA tool 210 at each prescribed time using a task scheduling function of the information processing device 200. The prescribed time is 2 hours, for example. Note that the startup controller 230 may activate the RPA tool 210 at an irregular timing, for example a timing at which a prescribed event occurs.

The warning section 240 issues a warning based on an instruction from the RPA tool 210. In detail, the RPA tool 210 determines presence or absence of an abnormality related to the production of the to-be-produced object based on the search result data or data resulting from the data processing by the data processing tool 220. The warning section 240 receives an instruction from the RPA tool 210 and issues a warning when the RPA tool 210 determines that an abnormality related to the production of the to-be-produced object is present. For example, the warning section 240 displays a warning screen when the RPA tool 210 determines that an abnormality related to the production of the to-be-produced object is present. Alternatively, the warning section 240 may issue a buzzer sound when the RPA tool 210 determines that an abnormality related to the production of the to-be-produced object is present.

The display section 250 displays an image based on the instruction of the RPA tool 210. The display section 250 is a liquid-crystal display, for example. The RPA tool 210 causes the display section 250 to display all or a portion of the search result data or the data resulting from the data processing by the data processing tool 220, for example.

Figure 2:
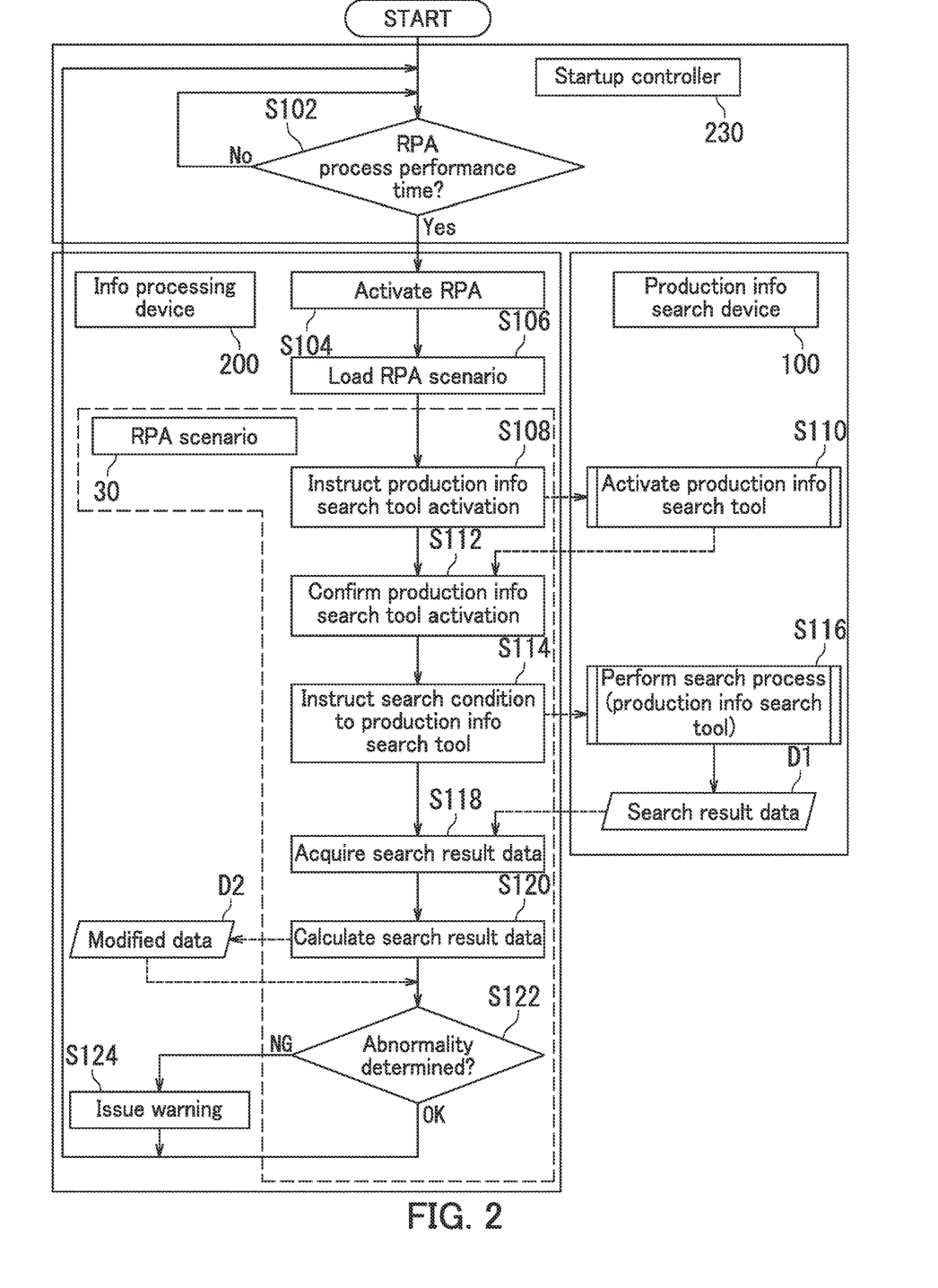
FIG. 2 is a flowchart depicting operation of the production information management system in the first embodiment of the present disclosure.
Figure 3A:
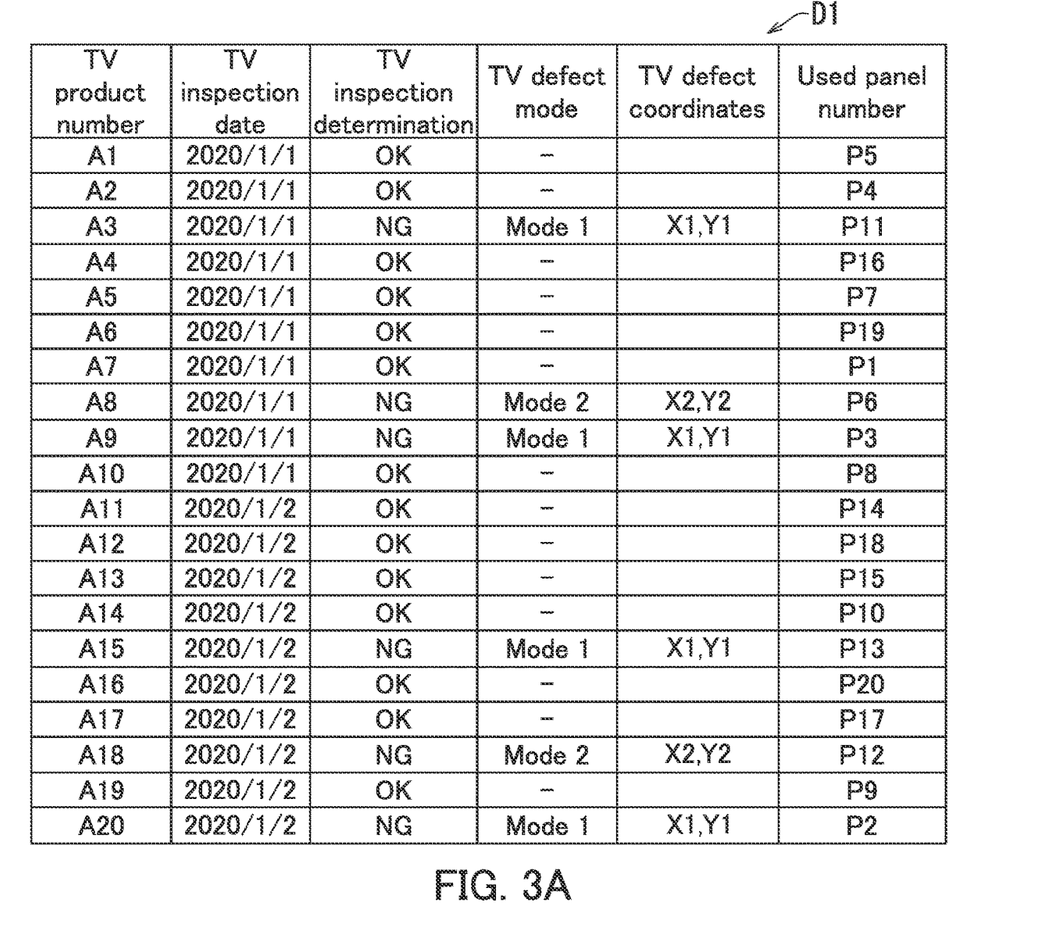
FIG. 3A is a table illustrating an example of search result data.
Figure 3B:
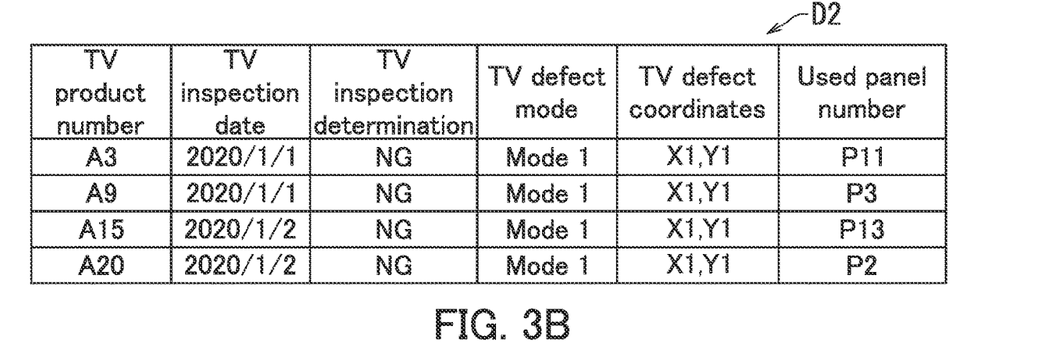
FIG. 3B is a table illustrating an example of modified data.

The operation of the production information management system 300 in the first embodiment of the present disclosure is described with reference to FIGS. 1 to 3B. FIG. 2 is a flowchart depicting the operation of the production information management system 300 in the first embodiment of the present disclosure. FIG. 3A is a table illustrating an example of search result data D1. FIG. 3B is a table illustrating an example of modified data D2.

Step S102: The startup controller 230 determines whether or not it is an RPA process performance time. That is, the startup controller 230 determines the necessity or non-necessity of activating the RPA tool 210 to perform the RPA process at a preset time (once every 2 hours, for example). When the startup controller 230 determines that it is not the RPA process performance time (Step S102: No), the process returns to Step S102. When the startup controller 230 determines that it is the RPA process performance time (Step S102: Yes), the process advances to Step S104.

Step S104: The startup controller 230 activates the RPA tool 210 at the prescribed time. The process advances to Step S106.

Step S106: The RPA scenario 30 is loaded to the RPA tool 210. As a result of the RPA scenario 30 being loaded to the RPA tool 210, the process of Steps S108 to S122 is performed based on the RPA scenario 30. The process advances to Step S108.

Step S108: The RPA tool 210 instructs activation of the production information search tool 110. The process advances to Step S110.

Step S110: The production information search tool 110 is activated. The process advances to Step S112.

Step S112: The RPA tool 210 confirms activation of the production information search tool 110. The process advances to Step S114.

Step S114: The RPA tool 210 instructs a search condition for the production information search tool 110. In detail, the RPA tool 210 inputs a search condition to the production information search tool 110 based on the RPA scenario 30. The search condition includes for example a range of a product inspection time, a targeted inspection process number, and a targeted inspection data item. The process advances to Step S116.

Step S116: The production information search tool 110 performs a search process based on the search condition instructed by the RPA tool 210. In detail, the RPA tool 210 causes the production information search tool 110 to acquire data meeting the search condition from the production information. As a result, the production information search tool 110 extracts the search result data D1. The process advances to Step S118.

Step S118: The RPA tool 210 acquires the search result data D1 from the production information search tool 110. The process advances to Step S120.

Step S120: The RPA tool 210 controls the data processing tool 220 so as to process the search result data D1. In detail, the RPA tool 210 enters the search result data D1 acquired by the production information search tool 110 to the data processing tool 220 and causes the data processing tool 220 to perform data processing based on the search result data D1. In further detail, a calculation process for the search result data D1 is performed using an operation function of the RPA tool 210 of the data processing tool 220. As a result of performing the calculation process for the search result data D1, the data processing tool 220 outputs the modified data D2. The process advances to Step S122.

Step S122: The RPA tool 210 determines presence or absence of an abnormality related to the production of the to-be-produced object based on the search result data D1 or the modified data D2 (data resulting from data processing). When the RPA tool 210 determines that an abnormality related to the production of the to-be-produced object is present (Step S122: NG), the process advances to Step S124. When the RPA tool 210 determines that no abnormality related to the production of the to-be-produced object is present (Step S122: OK), the process returns to Step S102.

Step S124: The warning section 240 issues a warning. The process returns to Step S102.

The search result data D1 is described with reference to FIG. 3A. As illustrated in FIG. 3A, the search result data D1 is data acquired by the production information search tool 110 searching for data meeting the search condition from the production information stored in the production information database 20.

FIG. 3A illustrates search result data when data meeting a search condition A is searched for and extracted from the production information database 20 as an example of the search result data D1. As an example, the search condition A includes "inspected TV product" as a search target, "inspection date from 2020/1/1 to 2020/1/2" as a search range, and "TV product number", "TV inspection date". "TV inspection determination", "TV defect mode", "TV defect coordinate", and "used panel number" as extraction items. The production information search tool 110 to which the search condition A has been input searches for data related to each inspected TV product on which inspection was performed from 2020 Jan. 1 to 2020 Jan. 2 and including each of the extraction items, and acquires the data from the production information. The data acquired through this search is the search result data D1. The search condition A is described as for example "(search target) inspected TV product. (search range) TV inspection date 2020/1/1 to 2020/1/2. (search items) TV product number, TV inspection date, TV inspection determination, TV defect mode. TV defect coordinates, used panel number" in the RPA scenario 30.

The search result data D1 includes "TV product number", "TV inspection date", "TV inspection determination", "TV defect mode", "TV defect coordinates", and "used panel number". "TV product number" is a number assigned to each TV product. "TV inspection date" is a date on which an inspection process was performed on the TV product. "TV inspection determination" is an inspection result of the inspection process on the TV product. "OK" of "TV inspection determination" indicates a case in which there was no problem in the inspection result of the inspection process on the TV product. "NG" of "TV inspection determination" indicates a case in which there was a problem in the inspection result of the inspection process on the TV product. "TV defect mode" indicates the type of defect when "TV inspection determination" is "NG". Here, mode 1 indicates that for example there is an unevenness flaw in the TV product provided that "TV inspection determination" is "NG". Mode 2 indicates that for example there is a punctiform flaw in the TV product provided that "TV inspection determination" is "NG". "Used panel number" is the number of panels each used as a component in the TV product.

The modified data D2 is described with reference to FIG. 3B. As illustrated in FIG. 3B, the modified data D2 is data produced by the data processing tool 220 modifying the search result data D1 based on modification method information. The modification method information is stored in the RPA scenario 30.

FIG. 3B illustrates modified data resulting from the search result data D1 being modified according to the modification method indicated by modification method information A as an example of the modified data D2. As an example, the modification method information A indicates a modification method in which a data record meeting a search condition is extracted from input data, and includes "'TV inspection determination' being NG" and "'defect mode' being mode 1" as conditions. The data processing tool 220 to which the search result data D1 and the modification method information A are input generates the modified data D2 by extracting the data record in which "TV inspection determination" is NG and "defect mode" is mode 1 from the search result data D1. The modification method information A is described as for example "(modification method) data extraction. (extraction condition) TV inspection determination=NG, defect mode=mode 1" in the RPA scenario 30. As illustrated in FIG. 3B, the modified data D2 is data acquired by extracting a data record in which "TV inspection determination is NG" and "defect mode is mode 1" from the search result data D1.

Note that the modified data D2 may further include a panel rank according to a value range of inspection data, coordinates of a position of a flaw, and a comparative calculation result of standard values of data, for example. When a panel rank is included in the modified data D2, the RPA tool 210 may display the result of ranking on the display section 250.

In the production information management system 300 as described above with reference to FIGS. 1 to 3B, the RPA tool 210 (integration tool) inputs a search condition based on the RPA scenario 30 (processing procedure information) to the production information search tool 110 (search tool) and the production information search tool 110 (search tool) acquires data (search result data D1) meeting the search condition from the production information stored in the production information database 20 (storage device). The RPA tool 210 (integration tool) inputs the search result data D1 acquired by the production information search tool 110 (search tool) to the data processing tool 220 and causes the data processing tool 220 to perform data processing based on the search result data D1. Accordingly, the production information management system 300 can automatically extract the search result data D1 from the production information database 20 (storage device) and perform desired data processing on the extracted search result data D1. As such, according to the production information management system 300, the production information search tool 110 (search tool) and the data processing tool 220 which do not have a function of operating in direct link with each other can be linked to perform a series of processes, and as a result the efficiency of production information management work can be improved.

In general, automatic operation of tools (search tool and data processing tool) with different application structures is difficult because the tools with different application structures are not easily linked. However, in the production information management system 300 of the present embodiment, tools with different application structures can be linked through the RPA tool 210 (integration tool). Accordingly, tools with different application structures can be caused to operate automatically.

In general, a production information search tool is a large-scale tool which performs data search from a production information database including an enormous amount of data. Accordingly, it is difficult to change the functions of or add functions to the production information search tool. However, in the production information management system 300 of the present embodiment, a search condition and process content can be easily changed by changing the RPA scenario 30 (processing procedure information). Accordingly, functions can be changed and functions can be added in a short period of time without increasing cost. As such, in the production information management system 300 of the present embodiment, the production information search tool 110 with fixed functionality can be given flexibility.

Furthermore, content of a defect generally occurring in the production process is not typical, and new types of defect can occur. That is, the search condition may be forced to change depending on the defect content. Even in this case, in the production information management system 300 of the present embodiment, the search condition can be easily changed by changing the content of the RPA scenario 30 (processing procedure information).

The production information management system 300 includes the startup controller 230. The startup controller 230 controls the timing at which the RPA tool 210 (integration tool) starts performing the series of processes according to the processing procedure. Accordingly, the RPA tool 210 (integration tool) performs the processing procedure automatically at a prescribed timing. Therefore, a person need not be present at the installation location of the production information search device 100. As a result, efficiency of production information management work can be improved.

The production information management system 300 includes the warning section 240. The RPA tool 210 (integration tool) determines presence or absence of an abnormality related to the production of the to-be-produced object based on the search result data D1 or the data resulting from the data processing. The warning section 240 issues a warning when the RPA tool 210 (integration tool) determines that an abnormality related to the production of the to-be-produced object is present. Accordingly, presence of an abnormality in the production of the to-be-produced object can be easily confirmed.

Data processing performed by the data processing tool 220 includes a modification process in which input data is modified. The RPA scenario 30 (processing procedure information) includes modification method information related to the modification process and indicating the modification method of the input data. The RPA tool 210 (integration tool) inputs the search result data D1 and the modification method information to the data processing tool 220 and causes the data processing tool 220 to modify the search result data D1 according to the modification method indicated by the modification method information. Accordingly, the search result data D1 can be automatically modified based on the modification method information. As a result, the efficiency of production information management work can be improved. Furthermore, the modification method can be easily changed by changing the content of the RPA scenario 30 (processing procedure information).

Second Embodiment

Figure 4:
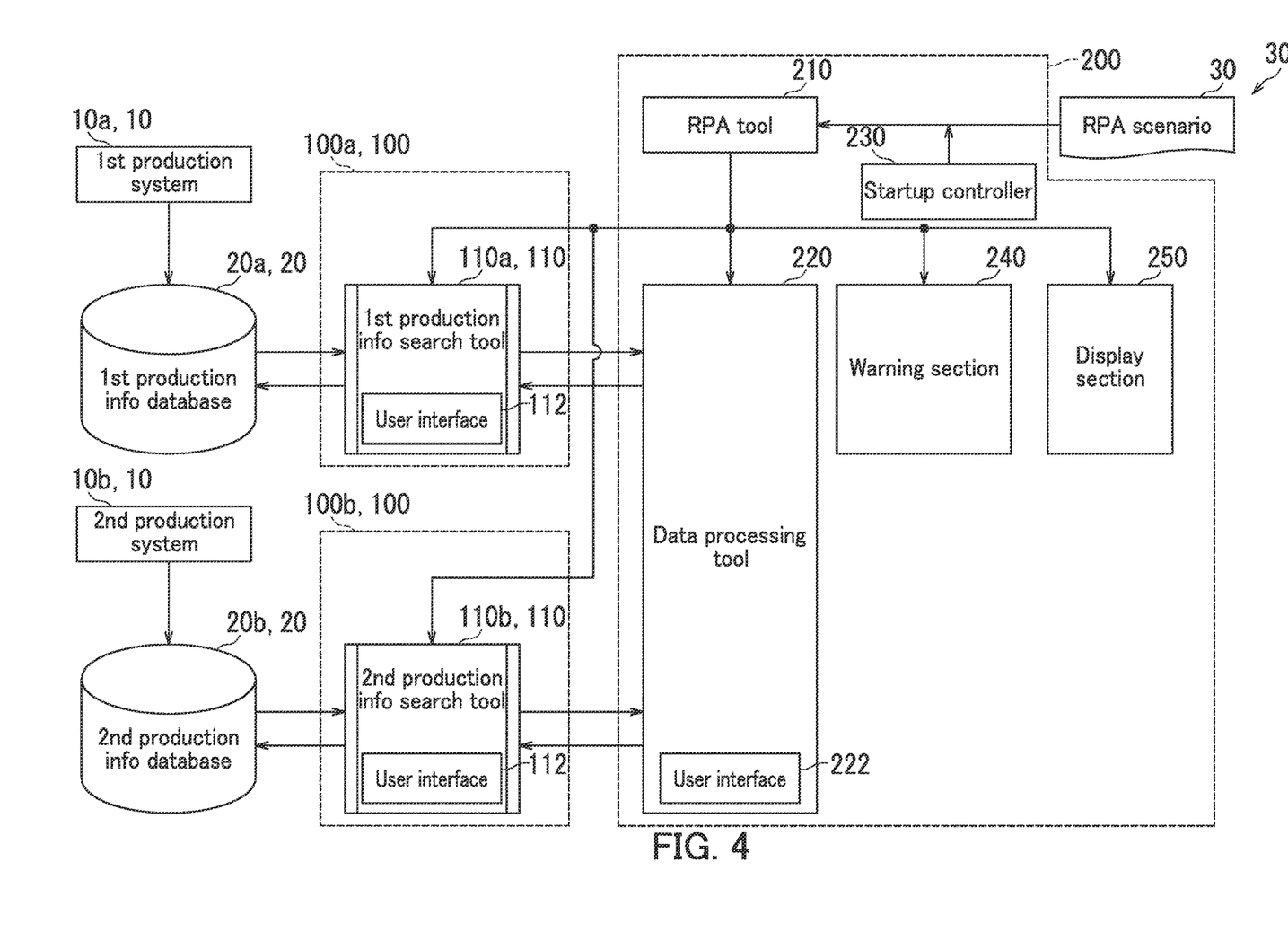
FIG. 4 is a block diagram of a production information management system according to a second embodiment.

A production information management system 300 according to a second embodiment of the present disclosure is described with reference to FIG. 4. FIG. 4 is a block diagram of the production information management system 300 of the second embodiment. The production information management system 300 of the second embodiment mainly differs from the production information management system 300 of the first embodiment in that two production information databases 20 and two production information search tools 110 are provided. In the following, the differences of the second embodiment from the first embodiment are mainly described. Description of elements shared with the first embodiment is omitted.

In the second embodiment, production information related to the production of the to-be-produced object is divided between a plurality of different servers (here, two servers: a first production information database 20a and a second production information database 20b) and managed. Specifically, first production information which is a portion of the production information is managed by the first production information database 20a, and second production information which is another portion of the production information is managed by the second production information database 20b. In the second embodiment, a system for producing the to-be-produced object is constituted by a first production system 10a which includes a portion of the devices constituting the system, and a second production system 10b which includes another portion of the devices constituting the system. In the production information, information collected in at least one of the devices of the above one portion is the first production information, and information collected in at least one of the devices of the above other portion is the second production information.

As illustrated in FIG. 4, the production information management system 300 includes two production information databases 20, two production information search devices 100, and an information processing device 200. The two production information databases 20 include the first production information database 20a and the second production information database 20b. The two production information search devices 100 include a first production information search device 100a and a second production information search device 100b. The production information management system 300 is a system which manages the production information of the first production system 10a and the production information of the second production system 10b.

The first production information database 20a and the second production information database 20b are servers, for example. The first production information database 20a stores therein the first production information which is a portion of the production information. The first production information is output from the first production system 10a. The second production information database 20b stores therein the second production information which is another portion of the production information. The second production information is output from the second production system 10b. Note that the first production information database 20a is an example of a "first storage device". The second production information database 20b is an example of a "second storage device".

The first production information search device 100a includes a first production information search tool 110a. The first production information search tool 110a can access the first production information which is a portion of the production information. Based on an input search condition, the first production information search tool 110a searches for and acquires data meeting the search condition from the first production information. The first production information search tool 110a includes a user interface 112.

The second production information search device 100b includes a second production information search tool 110b. The second production information search device 100b can access the second production information which is another portion of the production information. The second production information search tool 110b searches for production information from the second production information database 20b. The second production information search tool 110b searches for data meeting the input search condition and acquires the data from the second production information. The second production information search tool 110b includes a user interface 112.

The RPA tool 210 inputs a first search condition based on the RPA scenario 30 to the first production information search tool 110a and causes the first production information search tool 110a to acquire data meeting the first search condition from the first production information.

The RPA tool 210 inputs first search result data D1a acquired by the first production information search tool 110a and first modification method information based on the RPA scenario 30 to the data processing tool 220, and causes the data processing tool 220 to generate first modified data D2a which is data in which the first search result data D1a has been modified based on the first modification method information. The first modification method information indicates a method by which the first search result data D1a is modified. The first modification method information is stored in the RPA scenario 30.

The RPA tool 210 determines a second search condition based on the first modified data D2a. For example, the RPA tool 210 sets data values included in the first modified data D2a as one second search condition. In the present embodiment, the data values (P2, P3, P11, and P13) included in "used panel number" in the first modified data D2a are set as search targets in the second search condition. When the data values included in the first modified data D2a are set as one second search condition, information on the data values of which items of the first modified data D2a should be used as a search condition is added to the RPA scenario 30.

The RPA tool 210 inputs the second search condition to the second production information search tool 110b. The RPA tool 210 causes the second production information search tool 110b to acquire data (second search result data D1b) meeting the second search condition from the second production information.

The RPA tool 210 inputs the second search result data D1b acquired by the second production information search tool 110b and second modification method information based on the RPA scenario 30 to the data processing tool 220, and causes the data processing tool 220 to generate second modified data D2b which is data in which the second search result data D1b has been modified based on the second modification method information. The second modification method information indicates a method by which the second search result data D1b is modified. The second modification method information is stored in the RPA scenario 30.

The data processing performed by the data processing tool 220 includes a process of associating a plurality of pieces of input data. In detail, the RPA tool 210 inputs the first modified data D2a and the second modified data D2b to the data processing tool 220 and causes the data processing tool 220 to generate associated data D3. The associated data D3 is data in which the first modified data D2a and the second modified data D2b are associated based on corresponding data included therein.

Figure 5:
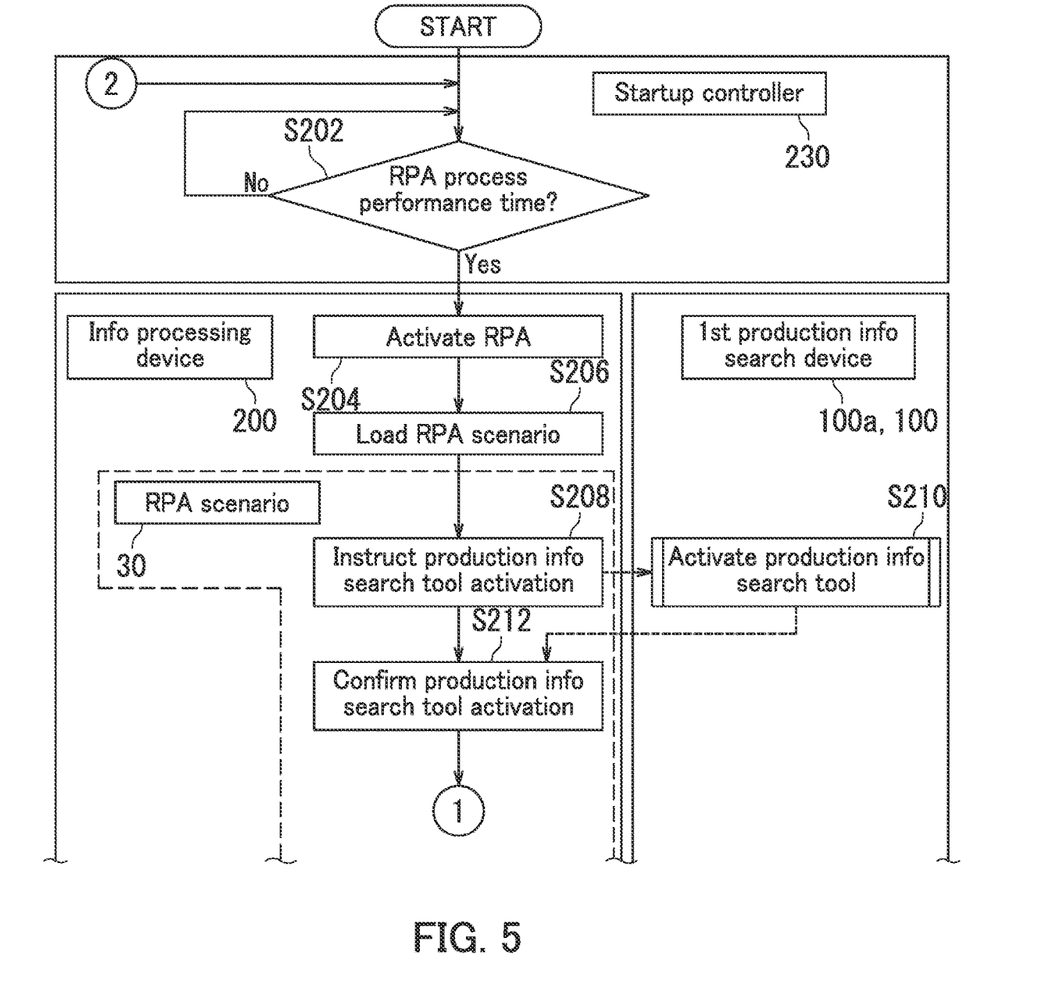
FIG. 5 is a flowchart depicting operation of the production information management system in the second embodiment of the present disclosure.
Figure 6:
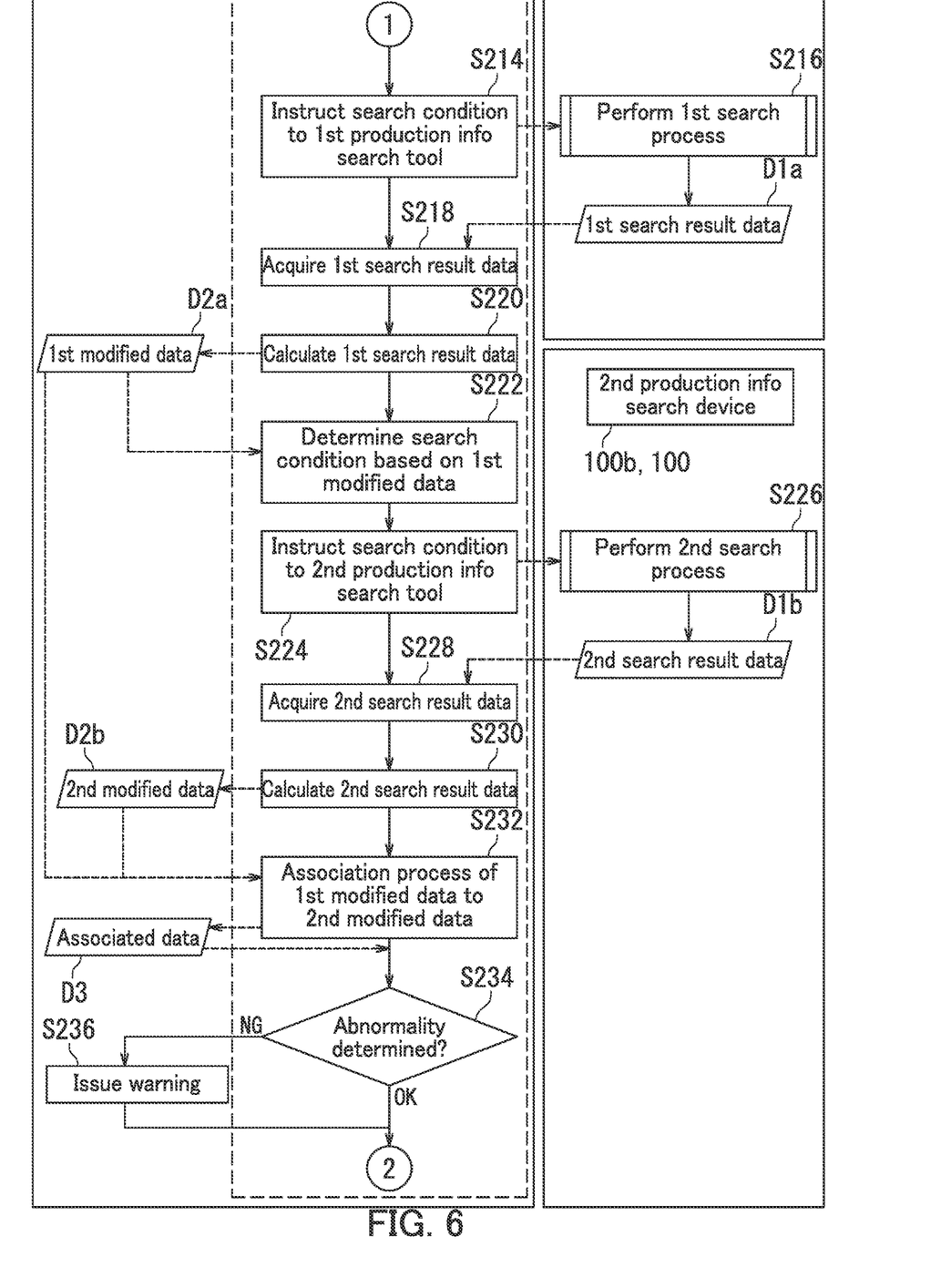
FIG. 6 is a flowchart depicting the operation of the production information management system in the second embodiment of the present disclosure.
Figure 7A:
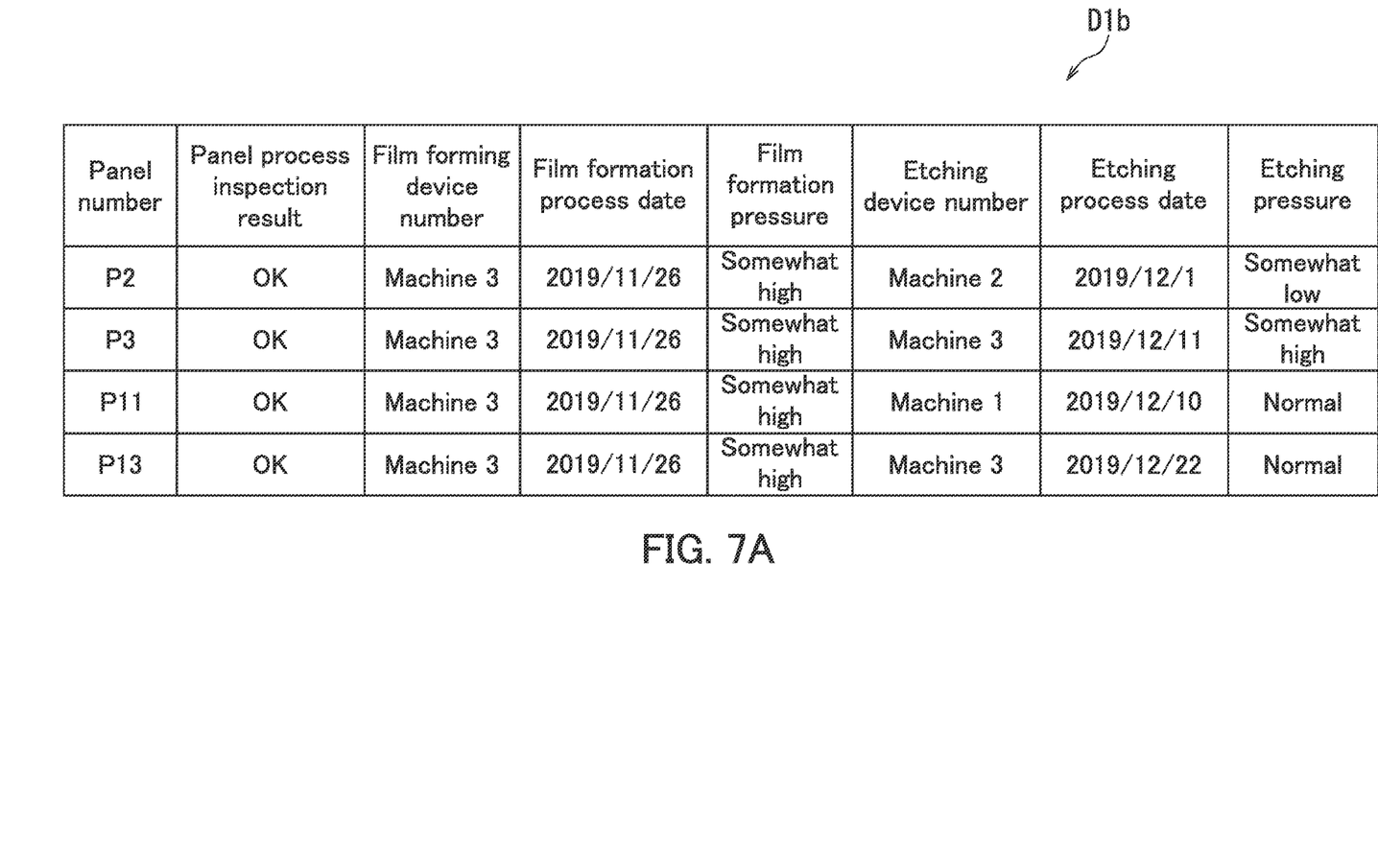
FIG. 7A is a table illustrating an example of second search result data.
Figure 7B:
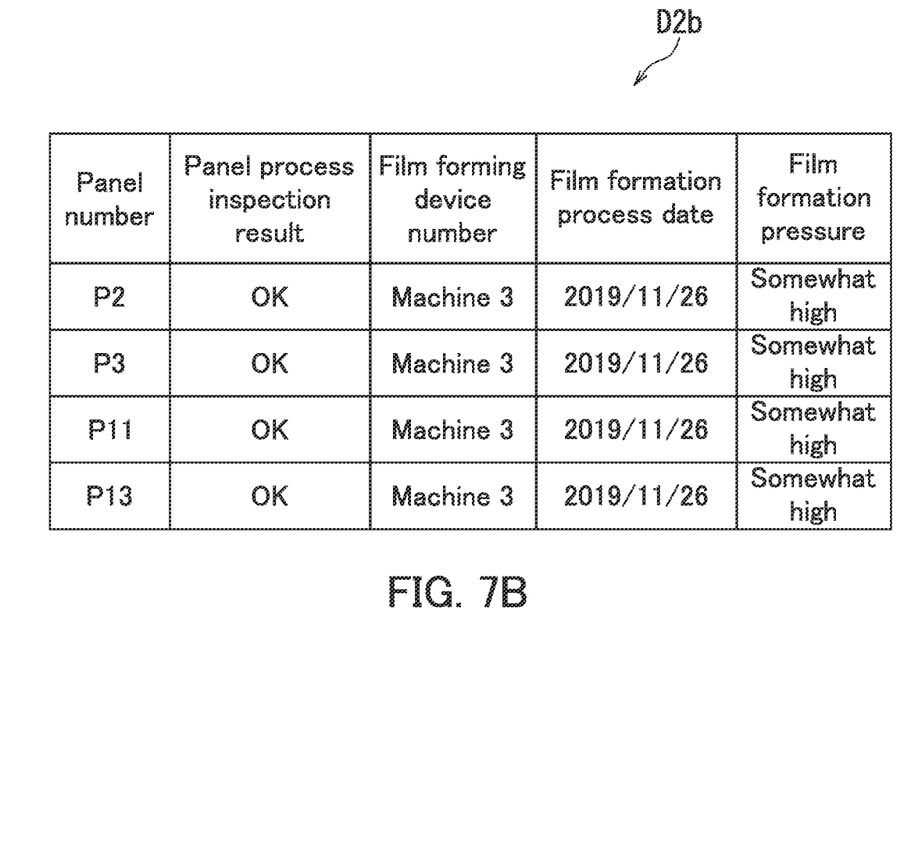
FIG. 7B is a table illustrating an example of second modified data.
Figure 8:
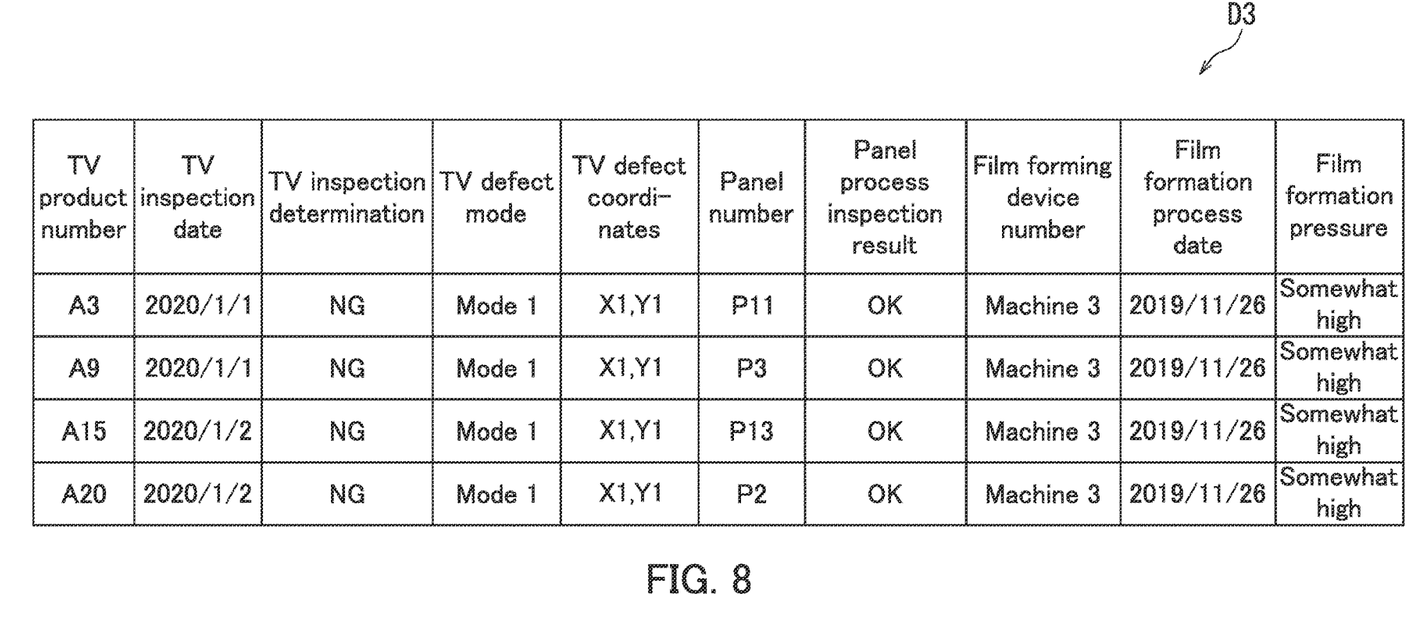
FIG. 8 is a table illustrating an example of associated data.

The operation of the production information management system 300 of the second embodiment of the present disclosure is described with reference to FIGS. 5 to 8. FIGS. 5 and 6 are flowcharts depicting the operation of the production information management system 300 of the second embodiment of the present disclosure. FIG. 7A is a table illustrating an example of the second search result data D1b. FIG. 7B is a table illustrating an example of the second modified data D2b. FIG. 8 is a table illustrating an example of the associated data D3.

In Steps S202 to S220, the same processing is performed as the processing of Steps S102 to S120 described with reference to FIG. 2. In detail, the first search result data D1a and the first modified data D2a are output by performing Steps S202 to S220. Note that the first search result data D1a is the same as the search result data D1 illustrated in FIG. 3A. Furthermore, the first modified data D2a is the same as the modified data D2 illustrated in FIG. 3B.

Step S222: The RPA tool 210 determines the second search condition based on the first modified data D2a. The process advances to Step S224.

Step S224: The RPA tool 210 instructs the second search condition for the second production information search tool 10b. In detail, the RPA tool 210 inputs the second search condition determined in Step S222 to the second production information search tool 110b. The process advances to Step S226.

Step S226: The second production information search tool 110b performs a search process based on the second search condition instructed by the RPA tool 210. In detail, the RPA tool 210 causes the second production information search tool 110b to acquire data meeting the second search condition from the second production information. As a result, the second production information search tool 110b extracts the second search result data D1b. The process advances to Step S228.

Step S228: The RPA tool 210 acquires the second search result data Dib from the second production information search tool 110b. The process advances to Step S230.

Step S230: The RPA tool 210 controls the data processing tool 220 so as to process the second search result data D1b. In detail, the RPA tool 210 inputs the second search result data Dib acquired by the second production information search tool 110b and the second modification method information based on the RPA scenario 30 to the data processing tool 220, and causes the data processing tool 220 to generate second modified data D2b which is data in which the second search result data D1b has been modified based on the second modification method information. In further detail, a calculation process for the second search result data D1b is performed using an operation function of the RPA tool 210 for the data processing tool 220. As a result of performing the calculation process for the second search result data D1b, the data processing tool 220 outputs the second modified data D2b. The process advances to Step S232.

Step S232: The RPA tool 210 controls the data processing tool 220 so as to perform association of the first modified data D2a and the second modified data D2b to generate the associated data D3. In detail, the RPA tool 210 inputs the first modified data D2a and the second modified data D2b to the data processing tool 220 and causes the data processing tool 220 to generate the associated data D3 in which the first modified data D2a and the second modified data D2b are associated based on the corresponding data included therein. The process advances to Step S234.

Step S234: The RPA tool 210 determines presence or absence of an abnormality related to the production of the to-be-produced object based on the associated data D3. When the RPA tool 210 determines that an abnormality related to the production of the to-be-produced object is present (Step S234: NG), the process advances to Step S236. When the RPA tool 210 determines that no abnormality related to the production of the to-be-produced object is present (Step S234: OK), the process returns to Step S202.

Step S236: The warning section 240 issues a warning. The process returns to Step S202.

The second search result data D1b is described with reference to FIG. 7A. As illustrated in FIG. 7A, the second search result data Dib is data acquired by the second production information search tool 110b searching based on a search condition for data meeting the search condition from the second production information stored in the second production information database 20b.

FIG. 7A illustrates search result data when data meeting a search condition B is searched for and extracted from the second production information database 20b as an example of the second search result data D1b. As an example, the search condition B includes "processed panel product" and "panels with panel numbers P2, P3, P11, and P13" as search targets, and "panel number". "panel processing inspection result", "film forming device number", "film formation process date", "film formation pressure", "etching device number". "etching process date", and "etching pressure" as extraction items. The second production information search tool 110b to which the search condition B has been input searches for data including the extracted items which are data related to a panel that bears any of P2. P3, P11, or P13 as the panel number and for which panel processing has been completed, and acquires the data from the production information. The data acquired through this search is the second search result data D1b. The search condition B is described in the RPA scenario 30 as for example "(search target) processed panel product, panel number=P2, P3, P11, P12 (search item) panel number, panel processing result, film forming device number, film formation process date, film formation pressure, etching device number, etching process date, etching pressure". Note that in FIG. 7A, "OK" is indicated in "panel processing inspection result", but more detailed information may be included such as "OK (slight flaw within OK standard).

The second modified data D2b is described with reference to FIG. 7B. As illustrated in FIG. 7B, the second modified data D2b is data produced by the data processing tool 220 modifying the second search result data D1b based on the second modification method information. The second modification method information is stored in the RPA scenario 30. The second modified data D2b is data extracted from the second search result data D1b with the following items of commonality: "film forming device number", "film formation process date", and "film formation pressure".

FIG. 7B illustrates modified data resulting from the second search result data D1b being modified according to the modification method indicated by modification method information B as an example of the second modified data D2b. As an example, the modification method information B indicates a modification method by which items of commonality are extracted from input data, and includes "panel number" and items based on a result of commonality search ("panel process inspection result", "film forming device number", "film formation process date", and "film formation pressure") as extracted items. The data processing tool 220 to which the second search result data D1b and the modification method information B have been input generates the second modified data D2b by extracting the extracted items from the second search result data D1b. The modification method information B is described as for example "(modification method) data extraction, (extracted item) panel number, items based on a result of commonality search) in the RPA scenario 30.

The associated data D3 is described with reference to FIG. 8. As illustrated in FIG. 8, the associated data D3 includes "TV product number", "TV inspection date", "TV inspection determination". "TV defect mode", "TV defect coordinates", "panel number", "panel process inspection result", "film forming device number". "film formation process date", and "film formation pressure". The associated data D3 is data in which the first modified data D2a and the second modified data D2b are associated based on corresponding data included therein, that is, data associated based on "used panel number" and "panel number". It is understood from the associated data D3 that panels which were processed on 2019 Nov. 26 by film forming device number 3 (film formation pressure was somewhat high) have slight flaws within the quality standards of the panel process inspection. Therefore, a TV product with such a panel has the possibility of a mode 1 defect at the coordinates (X1, Y1).

The RPA tool 210 determines presence or absence of an abnormality related to the production of the to-be-produced object based on the associated data D3. In detail, the RPA tool 210 determines whether or not an abnormality tendency has been discovered in the associated data D3. For example, the RPA tool 210 determines that an abnormality tendency has been discovered in the associated data D3 when defects with the same history are discovered in at least a prescribed proportion of all defects. The RPA tool 210 controls the warning section 240 so as to issue a warning when an abnormality tendency is discovered in the associated data D3.

Note that the RPA tool 210 may instruct a separate device from the information processing device 200 to issue a warning when an abnormality tendency is discovered in the associated data D3. For example, when an abnormality tendency has been discovered in the associated data D3, the RPA tool 210 may instruct an inspection device to issue a warning in inspection of a TV having the same processing history as that of a TV in which the abnormality tendency has been discovered. For another example, when an abnormality tendency is discovered in the associated data D3, a processing device for performing a process exhibited in the processing history in which the abnormality tendency has been discovered may be instructed to issue a warning.

As described with reference to FIGS. 4 to 8, the production information management system 300 includes a first production information search tool 110a (first search tool) and a second production information search tool 110b (second search tool). The RPA tool 210 (integration tool) determines a second search condition based on the first modified data D2a. The RPA tool 210 (integration tool) inputs the second search condition into the second production information search tool 110b and causes the second production information search tool 110b to acquire data meeting the second search condition from the second production information. Accordingly, the second search condition can be automatically input and the second search result data D1b can be automatically extracted. As a result, the efficiency of production information management work can be improved by linking the first production information search tool 110a (first search tool) and the second production information search tool 110b (second search tool).

Note that the first production information search tool 110a (first search tool) and the second production information search tool 110b (second search tool) may be arranged at separate sites. For example, the first production information database 20a belongs to a first production factory. A portion of the devices constituting the production system 10 is arranged in Factory A (the first production factory). The first production information database 20a stores therein the first production information collected in at least one of the above portion of devices. Furthermore, the second production information database 20b belongs to a second production factory. Another portion of the devices constituting the production system 10 is arranged in Factory B (the second production factory). The second production information database 20b stores therein the second production information collected in at least one of the above other portion of devices. Furthermore, the first production information search tool 110a (first search tool) may be installed in Factory A (the first production factory) and the second production information search tool 110b (second search tool) may be installed in Factory B (the second production factory). In this case, the first production information search tool 110a and the second production information search tool 110b which have different specifications can be virtually integrated. Accordingly, information search and information analysis can be performed seamlessly using the first production information search tool 110a (first search tool) and the second production information search tool 110b (second search tool). As a result, it is possible to flexibly cope with to a new factory development or a link with another company's factory.

The RPA tool 210 (integration tool) inputs the first modified data D2a and the second modified data D2b to the data processing tool 220 and causes the data processing tool 220 to generate the associated data D3 in which the first modified data D2a and the second modified data D2b are associated based on the corresponding data included therein. Accordingly, respective production information data from different processing can be associated with each other.

Embodiments of the present disclosure are described above with reference to the accompanying drawings (FIGS. 1 to 8). However, the present disclosure is not limited to the above embodiments and may be implemented in various manners within a scope not departing from the gist thereof (as indicated below in (1) and (2), for example). The drawings mainly illustrate various constituent elements schematically to facilitate understanding thereof. Aspects such as thickness, length, and number of the constituent elements illustrated in the drawings differ in practice for convenience of drawing preparation. Furthermore, aspects such as material, shape, and dimension of the constituent elements illustrated in the above embodiments are examples and not particular limitations. The constituent elements may be variously altered within a scope not substantially departing from the effects of the present disclosure.

(1) In the second embodiment, the production information management system 300 includes two production information databases 20, but the present disclosure is not limited as such. For example, the production information management system 300 may include one production information database 20 which is an integration of the first production information database 20a and the second production information database 20b.

(2) In the second embodiment, the production information management system 300 includes two production information search tools 110, but the present disclosure is not limited as such. For example, the production information management system 300 may include one production information search tool 110 which is an integration of the first production information search tool 110a and the second production information search tool 110b.

What is claimed is:

1. A production information management system comprising:
    a storage device that stores therein production information related to production of a to-be-produced object, the production information being information collected in a production system for producing the to-be-produced object;
    a search tool capable of accessing the production information stored in the storage device, and configured to search for and acquire data meeting an input search condition from the production information based on the input search condition;
    a data processing tool configured to perform data processing based on input data, the data processing tool being a tool which is different from the search tool and which does not have a function for operating in direct link with the search tool; and
    an integration tool configured to perform, based on processing procedure information indicating a predetermined processing procedure, a series of processes according to the processing procedure using a plurality of individual tools including the search tool and the data processing tool, wherein
    the integration tool
        inputs a search condition based on the processing procedure information to the search tool and causes the search tool to acquire data meeting the search condition from the production information, and
        inputs search result data acquired by the search tool to the data processing tool and causes the data processing tool to perform the data processing based on the search result data.

2. The production information management system according to claim 1, further comprising
    a startup controller configured to control a timing at which the integration tool starts performing the series of processes according to the processing procedure.

3. The production information management system according to claim 1, further comprising
    a warning section configured to issue a warning, wherein
    the integration tool determines presence or absence of an abnormality related to the production of the to-be-produced object based on the search result data or data resulting from the data processing, and
    the warning section issues the warning when the integration tool determines that an abnormality related to the production of the to-be-produced object is present.

4. The production information management system according to claim 1, further comprising
    a display section, wherein
    the integration tool causes the display section to display all or a portion of the search result data or data resulting from the data processing.

5. The production information management system according to claim 1, wherein
    the data processing includes a modification process in which the input data is modified,
    the processing procedure information includes modification method information related to the modification process and indicating a modification method of the input data, and
    the integration tool inputs the search result data and the modification method information to the data processing tool and causes the data processing tool to modify the search result data according to the modification method indicated by the modification method information.

6. The production information management system according to claim 5, wherein
    the search tool includes:
        a first search tool capable of accessing first production information which is a portion of the production information, and configured to search for and acquire data meeting an input search condition from the first production information based on the input search condition; and
        a second search tool capable of accessing second production information which is another portion of the production information, and configured to search for and acquire data meeting an input search condition from the second production information based on the input search condition, and
    the integration tool
        inputs a first search condition based on the processing procedure information to the first search tool and causes the first search tool to acquire data meeting the first search condition from the first production information,
        inputs first search result data acquired by the first search tool and first modification method information based on the processing procedure information to the data processing tool and causes the data processing tool to generate first modified data which is data in which the first search result data has been modified based on the first modification method information,
        determines a second search condition based on the first modified data, and
        inputs the second search condition to the second search tool and causes the second search tool to acquire data meeting the second search condition from the second production information.

7. The production information management system according to claim 6, wherein the integration tool inputs second search result data acquired by the second search tool and second modification method information based on the processing procedure information to the data processing tool and causes the data processing tool to generate second modified data which is data in which the second search result data has been modified based on the second modification method information.

8. The production information management system according to claim 7, wherein the data processing includes a process of associating a plurality of pieces of input data, and the integration tool inputs the first modified data and the second modified data to the data processing tool and causes the data processing tool to generate associated data in which the first modified data and the second modified data are associated based on corresponding data included therein.

9. The production information management system according to claim 6, wherein the storage device includes a first storage device which stores the first production information therein and a second storage device which stores the second production information therein.

10. The production information management system according to claim 9, wherein the first storage device belongs to a first production factory where a portion of devices constituting the production system is arranged, and stores therein the first production information collected by the portion of devices, and the second storage device belongs to a second production factory where another portion of devices constituting the production system is arranged, and stores therein the second production information collected by the another portion of devices.

11. The production information management system according to claim 1, wherein the individual tools each include a user interface, and the integration tool causes the individual tools to operate through the user interface included in each of the individual tools.

12. The production information management system according to claim 1, wherein the production information includes at least one of process data, process history data, and inspection result data which are related to the production of the to-be-produced object.

* * * * *